United States Patent

Rothschild et al.

[15] 3,649,128

[45] Mar. 14, 1972

[54] SYSTEM FOR DETERMINING THE PROPER EXPOSURE FOR A PHOTOGRAPHIC SURFACE

[72] Inventors: Stanley Rothschild, 10913 Lombardy Road; Bernard Goldberg, 805 Lombardy Center, both of Silver Spring, Md. 20901

[22] Filed: Nov. 27, 1970

[21] Appl. No.: 92,978

[52] U.S. Cl..............................356/215, 95/10 CD, 250/214, 356/226
[51] Int. Cl. .........................................G01j 1/46, G01j 1/44
[58] Field of Search ............356/215, 226; 95/10 CD, 10 CE, 95/10 CT; 250/214

[56] References Cited

UNITED STATES PATENTS

| | | | |
|---|---|---|---|
| 3,269,287 | 8/1966 | Ost | .............................................95/10 |
| 3,350,604 | 10/1967 | Erickson | ............................250/214 P |
| 3,486,821 | 12/1969 | Westhaver | ..........................95/10 CE |
| 3,516,751 | 6/1970 | Fruengel | ................................356/226 |
| 3,581,643 | 6/1971 | Yoshimura | ........................356/226 X |

Primary Examiner—William L. Sikes
Assistant Examiner—Warren A. Sklar
Attorney—Oberlin, Maky, Donnelly & Renner

[57] ABSTRACT

A system for determining the proper exposure for a photographic surface comprising a light sensing means for sensing the intensity of incoming illumination and converting the same to an electrical signal. Means for providing a time output signal representative of illumination conditions, and a multiplier in the circuit for multiplying the time and light signals. A read out unit is incorporated into the system for determining the proper exposure setting based on the ASA film speed used.

10 Claims, 10 Drawing Figures

INVENTORS
STANLEY ROTHSCHILD,
BERNARD GOLDBERG

BY

*Oberlin, Maky, Donnelly & Renner*

ATTORNEYS

Patented March 14, 1972

INVENTORS
STANLEY ROTHSCHILD,
BERNARD GOLDBERG

BY
Oberlin, Maky, Donnelly & Renner
ATTORNEYS

INVENTORS
STANLEY ROTHSCHILD,
BERNARD GOLDBERG 3,649,128

SYSTEM FOR DETERMINING THE PROPER EXPOSURE FOR A PHOTOGRAPHIC SURFACE

BACKGROUND OF THE INVENTION

The invention relates as indicated to a system for determining the proper exposure for a photographic surface. The term photographic surface as used herein is meant specifically to include photographic film and print paper, and any like materials having a surface whereby an image can be produced under given conditions of light intensity and time.

There are numerous types of devices embodying systems for determining proper exposure on the commercial market today, and these are generally referred to as flash or exposure meters. Although presently commercially available devices of this type function in the manner desired, all systems with which applicants are familiar are deficient for one or more reasons, such as, cost, size, a lack of flexibility to accommodate varying light conditions, imprecision, and in certain instances combinations of these.

Typical of the prior art approaches is the system disclosed in the Westhaver U.S. Pat. No. 3,486,821. Westhaver discloses a system which employs a field effect transistor circuit which functions both to integrate the light energy impinging on the sensor and to measure the integrated quantity. The circuit includes both a photosensitive field effect transistor (FOTOFET) and several field effect transistors (FET), with the system functioning to integrate the light energy falling on the film plane during the shutter operation.

Although the system of Westhaver constitutes an improvement in prior art devices of this type by being relatively small and relatively inexpensive to manufacture, its use is severely curtailed by the inability of the system to adapt and provide accurate results for steady state light conditions, that is, light conditions such as daylight, photoflooding, and the like. As will be explained in more detail hereinbelow, steady light input causes the output voltage of the Westhaver system to continuously rise thereby resulting in a saturated output that is not indicative of the true light conditions.

SUMMARY OF THE INVENTION

A primary object of the present invention is to provide a system which can be used in essentially any condition of light, including steady state light.

A more specific object of the present invention is to provide a system including light sensing means for measuring the incoming illumination and converting such illumination to an electrical signal. This system further includes a time converter unit the signal from which is multiplied with the light signal to provide a product which can be read within the system circuit to provide the proper f/stop based on existing light conditions. As will be explained in detail hereinbelow, the process of multiplication, as contrasted with the integration system of Westhaver, provides markedly increased accuracy.

A further object of the present invention is to provide such a system which can be, despite significantly increased accuracy, manufactured at relatively low costs and which is of a size to permit mounting of the same with existing camera equipment.

These and other objects of the invention will become apparent as the following description proceeds in particular reference to the application drawings.

BRIEF DESCRIPTION OF THE DRAWINGS

FIG. 7 is a diagrammatic view of the system in accordance with the present invention;

FIG. 10 is a schematic diagram of the electrical components of the system in the present invention.

DETAILED DESCRIPTION

Reference is now made to the application drawings and the following detailed description of applicants' invention.

The significant contribution which applicants have made to the art here concerned can best be seen by mathematically developing the light input and output data in accordance with the present invention and comparing the same with known prior art techniques. For comparison purposes, the system for integrating light energy disclosed in the Westhaver U.S. Pat. No. 3,486,821 will be used.

In the Westhaver system, the output of the capacitor integrating circuit can be represented mathematically by the following equation:

$$Vout = \frac{1}{C} \int_0^t i(t) dt, \qquad (1)$$

wherein $V$ = voltage output, $C$ is capacitance, "$t$" represents time, and $i(t)$ is the input light pulse.

Figure 1:
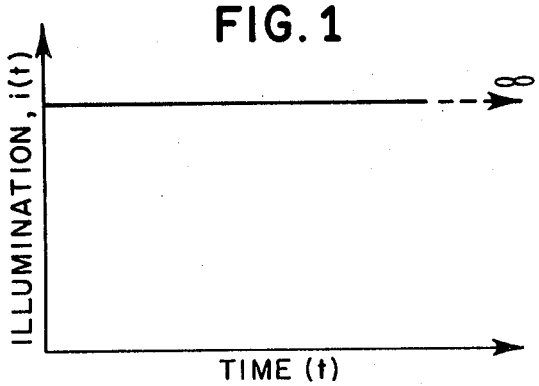
FIG. 1 comprises a graphic representation of a steady state light condition.
Figure 2:
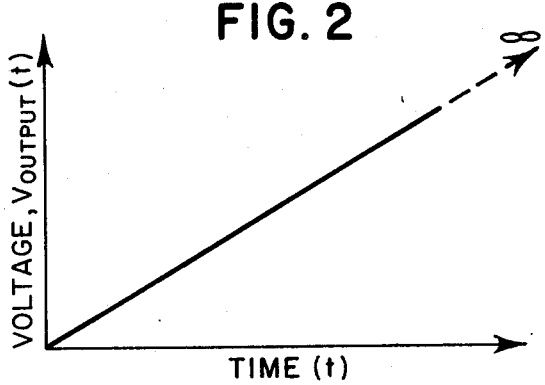
FIG. 2 shows a graphical representation of the output voltage under conditions of steady light input.

It will be seen from the above equation that a steady light input causes the output voltage to continuously rise since the time "$t$" increases without limit. This results in a saturated, meaningless output. This relationship is shown in FIGS. 1 and 2, with FIG. 1 representing a steady state light condition typified, for example, by daylight or photoflooding conditions, and FIG. 2 showing the continually rising output voltage.

Figure 3:
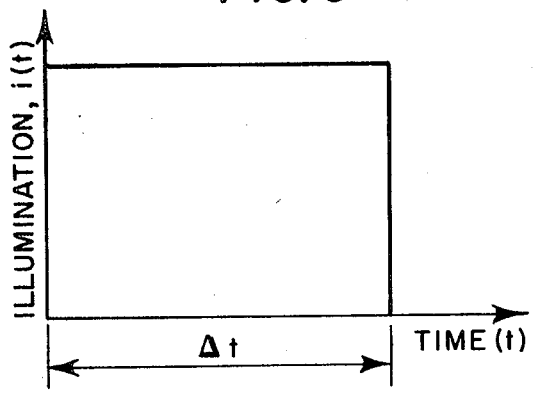
FIG. 3 is a graphic representation of a light condition wherein the light intensity is constant and finite over a short period of time.
Figure 4:
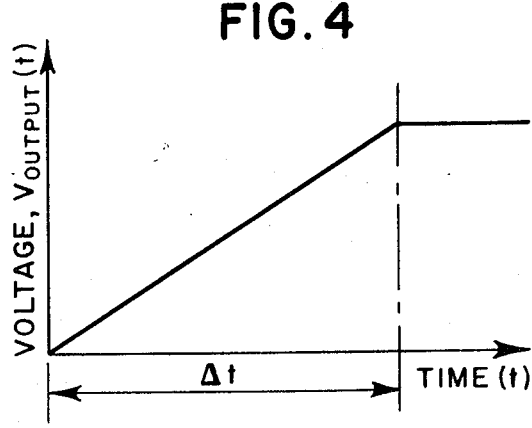
FIG. 4 is the voltage output of the light condition of FIG. 3.

A second type of light input is shown in FIG. 3 wherein the light intensity is a constant value over a relatively short period of time, $\Delta t$. The output voltage shown in FIG. 4 is a ramp having a slope proportional to the intensity and the duration of the light input, $\Delta t$. FIGS. 3 and 4 represent the type of light pulse obtained by the opening and closing of the shutter of a camera.

Figure 5:
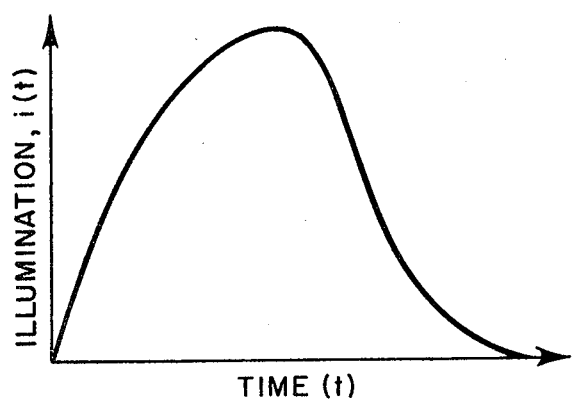
FIG. 5 is a graphic representation of third type of light pulse provided, for example, by the strobe light, and the type of pulse to which the Westhaver patent is directed.
Figure 6:
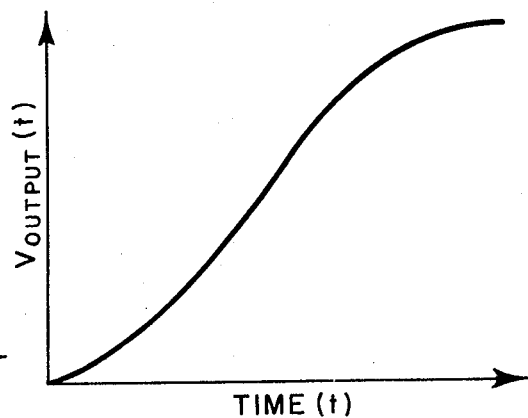
FIG. 6 is the voltage output curve for the light pulse shown in FIG. 5.

The third type of light pulse is the strobe light, and the type of light pulse to which the Westhaver patent is directed. FIG. 5 represents graphically the light input of a strobe light, and FIG. 6 represents a corresponding voltage output.

When employing a strobe light, one of the basic difficulties is in determining the amount of energy in the trailing edge of the pulse and to effectively detect and integrate this remaining portion of the light pulse. Since there is obviously useful exposure value in this portion of the pulse, the total voltage output without accurately taking into account this portion of the pulse will not yield a proper or accurate value for the exposure of f/stop.

In accordance with the present invention, accurate exposure values can be obtained regardless of existing light conditions, with the system therefore being particularly useful in steady state light conditions.

Proper exposure illumination can be represented by the formula:

$$H = Kf^2/sT, \qquad (2)$$

wherein $H$ = illumination, $f$ = f/number, $s$ = a constant representing the "speed" of the photographic surface, $K$ is a constant, and $T$ = time of exposure in seconds. Equation (2) can be rewritten as follows:

$$H \times T = Kf^2/s \qquad (3)$$

The system of the present invention can accurately determine the variables $H$ and $T$ on the left side of equation (3) and convert the same to electrical signals for processing or reading out the light input data. These electrical signals when multiplied provide an equation whose only remaining unknown is the $f$/number, which can be readily determined.

The present invention in block diagram form is shown in FIG. 7. The sensor 10 comprises any commercially available photo detector which has a spectral response curve, such as for example, a silicon photo detector. Amplifiers $A_1$ and $A_2$ preferably comprise integrated circuits and are commercially available items, being sold, for example, by Motorola Corp., Fairchild Semiconductor, Inc. and others, with the amplifiers of Fairchild Semiconductor, Inc. being identified commercially as type 709.

The sensor 10 functions to detect the incoming illumination and to convert such illumination to an electrical signal, with the amplifier $A_1$ increasing such signal for subsequent processing, if such amplification is needed. The illumination output signal from $A_1$ is designated H. Amplifier $A_2$ receives the electrical output signal from either sensor 10 or from the output of $A_1$ and provides a high gain output signal. Amplifier $A_2$ is used when short duration light pulses such as strobe lights, shutters, and the like are used. The amplifier $A_2$ is actuated only as long as useable light is available, but is not necessary for use for fixed time or for long time exposures.

The electrical signal produced by amplifier $A_2$ is directed to the time signal converter unit 12, which has an output signal directly related to the amount of time $A_2$ remains actuated.

The output signal from the time signal converter unit is represented in FIG. 7 by T and is directed to a multiplier unit 14, which also receives the electrical signal H from the amplifier $A_1$. The multiplier unit 14 effects a multiplication of the signals H and T to yield a product signal H × T which is delivered to a read-out unit 16.

Where available light is used, a special timer 18 is employed which functions to send a fixed time interval signal to the time signal converter unit 12 thereby enabling the latter to determine the proper T under steady state light conditions.

The time signal converter unit 12 and the multiplier unit 14 are both commercially available items, with the multiplier unit, for example, comprising a four quadrant multiplier manufactured by Fairchild Semiconductors, Inc. and identified as item $\mu$ A795. 1 makeup of read-out unit 16 will be discussed in more detail hereinbelow when particular reference is made to FIG. 10. The system as diagrammatically shown in FIG. 7 also comprises an $f$/stop and ASA control unit 20 which is incorporated in the system to add flexibility thereto. The unit 20 allows the use of all available film emulsions and print papers, and provides an ASA signal to the read-out unit 16, either directly, or coupled with the multiplier output signals, as shown in dashed lines in FIG. 7, for processing with the multiplier signal (H × T).

The process of multiplication in accordance with the present invention provides greatly increased accuracy as compared with the integration technique employed in the system of Westhaver as defined by equation (1). By way of contrast, the pulse detected by the optical sensor 10 of the present invention can be represented, to a close approximation, by the following expression:

$$i_n(t) = A \left(\pi - \frac{\pi t}{T}\right)^n \sin \frac{\pi t}{T}, \qquad (4)$$

in which n is a constant defining the sharpness of the pulse, that is, a constant which determines the time at which the light pulse peaks, $T$ = total time that the pulse is present, $t$ is the time period within period $T$, and $A$ is an amplitude constant.

Figure 8:
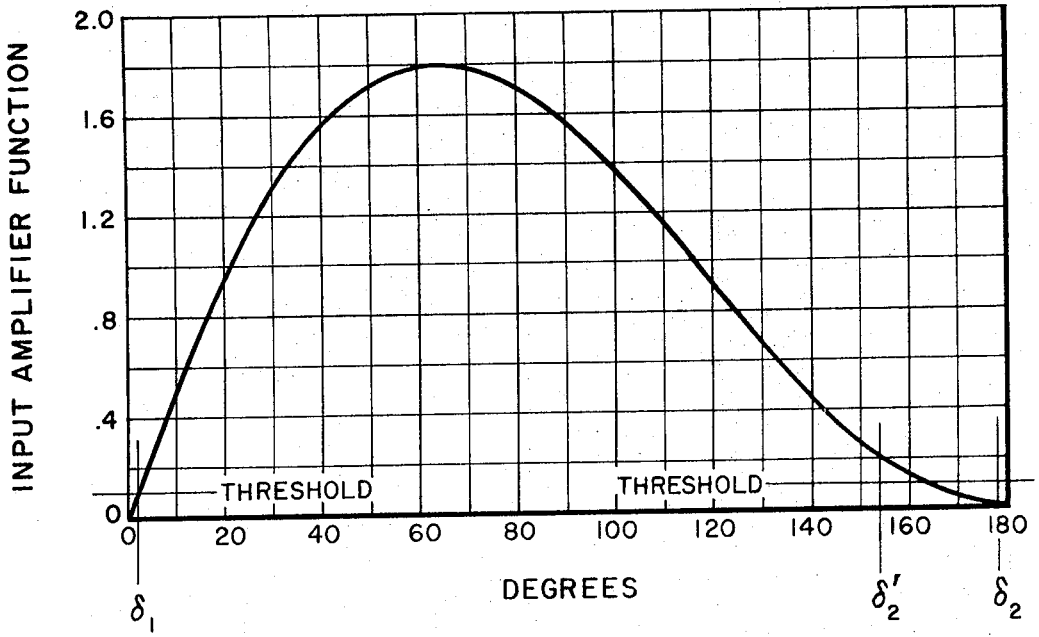
FIG. 8 is a graphical plot of equation (4) with the ordinant comprising the amplitude constant and the abscissa the total time the pulse is present.

Equation (4) is shown plotted in FIG. 8, for $n = 1$. In FIG. 8, the ordinant comprises amplitude values expressed in volts, and the abscissa comprises time expressed in degrees.

Substituting equation (4) into equation (1) gives the following:

$$V_1 = A \int_{t_1}^{t_2} \left(\pi - \frac{\pi t}{T}\right) \sin \frac{\pi t}{T} dt \qquad (5)$$

The limits on the integral, $t_1$ and $t_2$, represent the total time that the sensor and its associated electronics see the pulse, or the time interval $T$ ($t_2 - t_1$) during which the voltage level is above some threshold value. Equations (4) and (5) can be simplified by substituting $x = \pi t/T$.

Equation (4) when substituted into equation (1) will give the exact value of the output voltage when the limits of integration are zero and $T$. This value can be called $V_0$. If we now let the lower limit in equation (5) be defined as $\delta_1$, and the upper limit be defined as $\pi - \delta_2$, these are the values of t which represent the threshold value of the integrating circuits. Making these substitutions into equation (5) gives:

$$V_1 = \frac{AT}{\pi} \int_{\delta_1}^{\pi-\delta_2} (\pi - x) \sin x \, dx \qquad (6)$$

The value of $\delta_2$ cannot be well defined due to the relatively flat slope near the cut-off value. In typical circuits, in the vicinity of $\delta_2$, this uncertainty can be as high as ± 0.1 of a volt, and for some strobe lights, the variation in $\delta_2$ can be extensive, for example, those with high peak values (sharp leading edges) and long trailing edges or tails. As a result, the variation between successive readings can vary greatly.

If now in equation (6) we let ($\pi - \delta_2$) be the cut-off value for a particular flash, that is when there is no longer useable light available, and let the value of this integral be $V_{11}$, and if we let ($\pi - \delta_2'$) be the cut-off value for succeeding flash, and let the integral have a value of $V_{12}$, the normalized difference between these two readings is the error. This error can be given a value of $E_1$, and expressed by the following:

$$E_1 = V_{11} - V_{12}/V_0, \qquad (7)$$

$$E_1 = \frac{\frac{AT}{\pi}\left[\int_{\delta_1}^{\pi-\delta_2}(\pi-x)\sin x \, dx - \int_{\delta_1}^{\pi-\delta_2'}(\pi-x)\sin dx\right]}{\frac{AT}{\pi}\int_0^{\pi}(\pi-x)\sin x \, dx} \qquad (8)$$

Equation (8) can be rewritten in the following form:

$$E_1 = \frac{\int_{\pi-\delta_2}^{\pi-\delta_2'}(\pi-x)\sin x \, dx}{\int_0^{\pi}(\pi-x)\sin x \, dx} \qquad (9)$$

Performing the integration, when $\delta_1$, $\delta_2$, and $\delta_2'$ are small, which will allow for small angle approximations for the sine and cosine functions, $E_1$ can be expressed as:

$$E_1 = \frac{1}{2\pi} | \delta_2^3 - \delta_2'^3 | \qquad (10)$$

This error function will be evaluated and compared to the error obtained by the multiplication method used in accordance with the present invention.

Referring now to the system of the present invention, assume that the same light pulse is detected and converted to the identical signal used in the above example. However, since the present system comprises a multiplication rather than integration of the input data, the signal, after multiplication by the timing pulse, can be represented as follows:

$$H \times t = M(t) = A\left(\pi - \frac{\pi t}{T}\right)\sin\frac{\pi t}{T} \cdot (t) \qquad (11)$$

In the above equation the timing signal is a unit ramp function $(t)$. If we again let $x = \pi t/T$, then equation (11) can be written as follows:

$$M(x) = AT/\pi \, (\pi - x) \sin x \cdot (x) \qquad (12)$$

Figure 9:
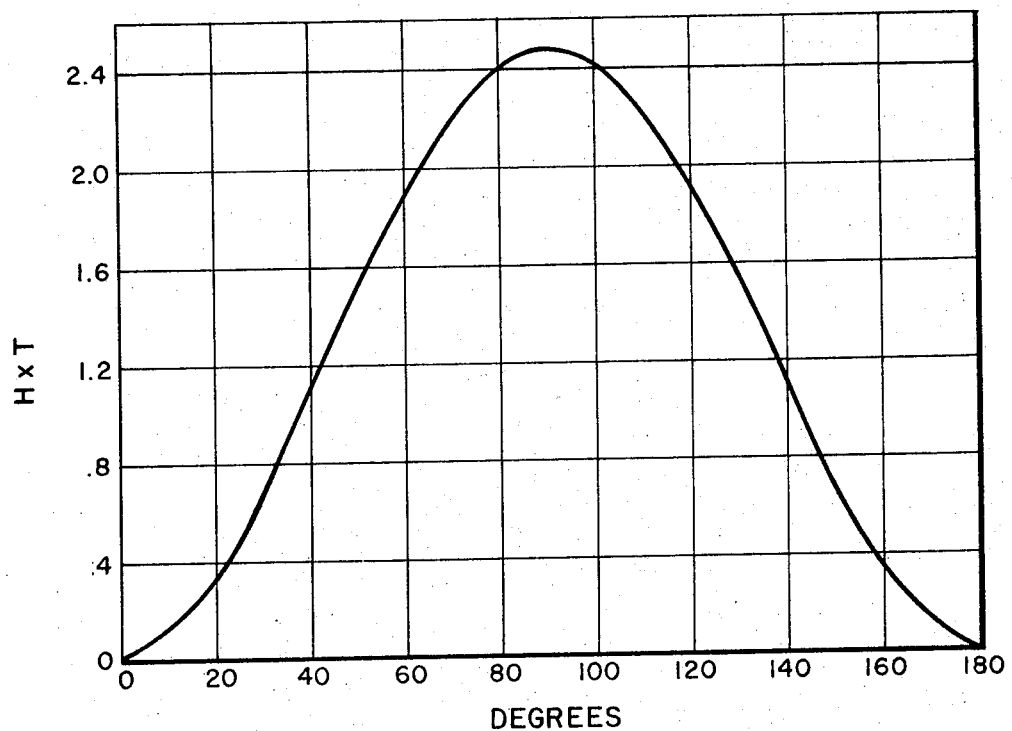
FIG. 9 is a view similar to FIG. 8, comprising a graphical representation of equation (12)

This function is shown in FIG. 9, with the ordinant in this figure comprising $M(x)$ and the abscissa comprising the time function expressed in degrees.

The processing technique used in the read-out system in accordance with the present invention comprises peak detection, that is, the holding of the maximum value of the signal applied to it. If the system holds the exact peak, and if the ramp function starts exactly at $t=0$, there will be no error in the output. Let the value of $x$, at which this peak occurs, be defined as $x_0$.

As above described, amplifier $A_2$ is employed to amplify the input signal, with a typical value of amplification being in excess of 100. As will be described later, in particular reference to FIG. 10, this signal is used to switch on the ramp generator. If the ramp generator is turned on at a threshold voltage of 0.1 volts, then it will be triggered on when the input signal to amplifier $A_2$ is 0.001 volts. At this voltage input into the amplifier, the ramp generator voltage will be shifted in phase by 0.0030 radians. ($\pi$ radians = 180°) This delay in the ramp voltage will modify equation 12 to the following expression:

$$M(x,\beta) = AT/\pi\,[(\pi-x)\sin x]\,(x\beta) \qquad (13)$$

where $\beta$ is the delay in the ramp generator's voltage.

With the proper choice of components in the peak detector circuits, it will be possible to hold the exact peak of the signal. The effect of $\beta$ is to shift the peak of the signal from $x_0$ to $(x_0+\epsilon)$. With the value of $\beta = 0.0030$, the equation (13) will have a peak shifted by an amount $\epsilon = 0.00663$. The normalized voltage error can therefore be similarly defined as follows:

$$F = \frac{M(x_0) - M(x_0,\beta)}{M(x_0)} \qquad (14)$$

Evaluation of equations (10) and (14) can now be performed to show how the multiplication technique greatly improves the accuracy as compared with the integration technique. In the latter, assuming that the threshold level is 0.1 volt and that the variations from this value are $-0.08$v and $+0.1$v, $\delta_2$ and $\delta_2'$ values of $\pi/180$ and $26\,\pi/180$, respectively, are derived. These voltage values are reasonable.

Substituting these values into equation (10) gives the error voltage $E_1 = 0.0149$. The peak detector will be able to detect and hold the peak value. Substituting the values of $\epsilon$ and $\beta$ into equation (14) give the error voltage $F = 0.0019$.

The improvement in accuracy in the respective systems is therefore the ratio of $E_1/F$, and is calculated as follows:

$$E_1/F = 0.0149/0.0019 = 7.84$$

Thus, an improvement in accuracy by a factor of nearly 8:1 can be realized for the conditions assumed above. By assuming higher gain values for amplifier $A_2$, still higher improvement factors can be realized, since the phase shift in the ramp generator signal ($\beta$) will be smaller than that assumed here.

Reference is now made to FIG. 10 which comprises a schematic view of the components of the system of the present invention. Those components which have been previously identified in connection with FIG. 7 have been represented by the same reference numeral. It will be understood that no invention resides in the specific construction of the individual components illustrated and described. Rather, the invention constitutes the unique combination of these components to produce the improved results obtained in accordance with the present invention.

In the circuit between the sensor 10 and the amplifier $A_1$ is positioned transistor $Q_1$, which functions as an impedance match and signal conditioner. Interposed between amplifiers $A_1$ and $A_2$ and the multiplier unit 14 are a series of switches $SW_1$, $SW_2$, $SW_3$ and $SW_6$. $SW_1$ has three positions or settings indicated at 1, 2 or 3. When amplifier $A_2$ is not in the circuit, the switch $SW_1$ can be on position 1 or 3. On position 1, long time exposures are measured by depressing $SW_2$. As long as $SW_2$ is depressed, the meter will continue to "read" until proper exposure is obtained at which time $SW_2$ is opened. By using an accurate clock, very long time exposures can be determined.

When switch $SW_1$ is on position 3, a fixed exposure time such as 1 second, 1/50 sec., 1/100 sec., can be used as determined by selection of one of the o.s. (one-shot multivibrator) timing capacitors $C_1$ thru $C_n$. In a matter well-known in the art, the multivibrator o.s. is activated by closing switch $SW_6$, thereby giving a single voltage output timing pulse of the proper polarity.

The pulse, from either the output of amplifier $A_2$, the o.s., or the fixed voltage applied through switch $SW_2$, will cause transistor $Q_3$ to conduct. The output voltage at the collector of $Q_3$ will go from the negative supply voltage to ground. This voltage will be fed back to the base of transistor $Q_4$ through resistor $R_1$. This will cause the voltage at the collector of $Q_4$ to rise to the value of the negative supply voltage, which voltage will cause the field effect transistor (FET) $Q_6$ to turn off. When the latter is turned off, the ramp generator $A_3$ is turned on. The ramp generator produces an output voltage that is linearly proportional to time, that is, $E(t) = k_1 t$ where $k_1 = V_1/R_T C_T$. This voltage is applied as one of the inputs to the multiplier unit 14.

The second input to the multiplier unit 14 is the voltage from the amplifier $A_1$. The output from the amplifier is directly proportional to the intensity of the light detected by the sensor 10, and can be represented by the expression:

$$E(H) = k_2 H, \qquad (15)$$

where $k_2$ is proportional to the gain of the amplifier $A_1$, the sensor characteristics, and the characteristics of transistor $Q_1$.

The output of the multiplier unit 14 is the product of the two input voltages $E(H)$ and $E(t)$, specifically $$E(H) \times E(t) = (k_2 H) \times (k_1 t) = (k_1 k_2) \times (H \times t) \qquad (16)$$

Comparing equation (16) with equation (3), it will be seen that when the product $E(H) \times E(t)$ is made equal to $Kf^2/s \times k_1 k_2$, the proper exposure of the photographic surface can be obtained.

The output signal of the multiplier unit 14 is applied to the read-out circuit, composed of FET $Q_5$, hold-off diode $D_1$, capacitor $C_5$, holding amplifier $A_4$, resistors Rf and Ra, and current meter M. $Q_5$ is turned on during the time that light is detected by the sensor. This allows the capacitor $C_5$ to charge up to the value of $H \times t$. The hold-off diode $D_1$ prevents the capacitor from discharging back into the multiplier. Amplifier $A_4$ is a voltage follower of the type 302, manufactured by National Semiconductor.

After the light pulse is removed, the FET $Q_5$ will be turned off, presenting an extremely high impedance to the capacitor allowing it to hold its charge. The input impedance to the amplifier $A_4$ is also extremely high, and as a result the capacitor $C_5$ will continue to hold its charge, presenting a constant voltage input to amplifier $A_4$. The output voltage of $A_4$ is equal to its input voltage. The current read on the current meter is adjusted by means of resistors Rf and Ra to read a preassigned value. Switch $SW_5$ discharges the capacitor $C_5$ after a reading has been made, which removes the voltage from the input to $A_4$.

Resistor Rf is used to determine what $f$/stop should be used for a specific ASA film speed set by resistor Ra. When the meter is used in mode 3 (Switch $SW_1$ placed in position 3), fixed exposure times are determined by switch $SW_3$. The adjustment of Rf will determine what specific $f$/stop should be used for the specific light condition and time. The $f$/stop is read from a calibrated dial, as is the ASA number.

The circuit of FIG. 10 additionally includes conventional components, such as resistors and the like, which perform their usual function and which are shown by conventional electrical symbols. Those skilled in the art will readily understand the presence of these members in the circuit to accomplish the desired circuit control.

In a second mode of operation, wherein the reading is to be made on the ground glass of a camera, both time and intensity of the light impinging onto the ground glass can be individually adjusted, and Rf and Ra set to a preassigned value. The sensor is placed on the ground glass in the vicinity of where most interest of the picture will be. The shutter is opened for the period of time determined by the shutter speed. The amount of light entering the camera lens is determined by the $f$/stop on the camera. If there is insufficient light entering the camera, the meter will read less than a preassigned value; if there is too much light, the meter will read more than this preassigned value. Thus, by adjusting the f/stop on the camera for the proper value on the meter, then the proper value of $H \times t$ will be achieved, and the correct exposure will be obtained. The same procedure is used when a strobe light is used in conjunction with the ground glass reading, except that the time is now controlled by the strobe light duration, rather than the camera shutter speed.

In a third mode of operation, for long time exposures as a result of very low light levels, Switch $SW_2$ is closed, and the length of time required for the meter to reach the proper value can be measured by an external measuring device.

It will be understood by those skilled in the art that variation from the above disclosure can be made without departing from the spirit of the invention. For example, rather than using the type of multiplier disclosed, log-amplifiers can be used to convert the time and illumination signals to logarithms, the addition of which provides the correct value for input to the read out unit. Other equivalents will suggest themselves to those skilled in the art, and the invention therefore should be considered commensurate with the scope of the appended claims.

We claim:

1. A system for determining the proper exposure for photographic surfaces comprising:
   a. light sensing means for sensing the intensity of incoming illumination and converting the same to an electrical output signal,
   b. time output signal producing means coupled to said light sensing means for producing a time output signal proportional to the time the illumination is present on said light sensing means,
   c. multiplier means coupled to said light sensing means and said time output signal producing means for multiplying said time output signal and said electrical output signal to yield a time-light product output signal, and
   d. means responsive to said time-light product output signal for determining the proper exposure setting depending upon the characteristics of the photographic surfaces.

2. The system of claim 1 wherein said light sensing means comprises a photo detector having a suitable response curve.

3. The system of claim 1 further including amplifying means comprising a first amplifier for amplifying the light signal in direct proportion to the intensity of the light detected by said light sensing means and a second amplifier for amplifying said light signal by a fixed amount.

4. The system of claim 3 wherein said time output signal producing means comprises a time converter unit coupled to said second amplifier for receiving the amplified signal therefrom, said time converter unit providing a time output signal to said multiplier means proportional to the time of the amplified signal from said second amplifier.

5. The system of claim 4 further including supplemental timing means for sending a fixed time signal to said time converter unit under steady state, low light conditions.

6. The system of claim 4 further including supplemental timing means for sending continuous time signals when said system is used for long time exposure.

7. The system of claim 1 further including readout means comprising capacitor means adapted to be charged and to hold the output voltage signal of said multiplier means, meter means for reading the hold voltage, and means for determining the proper camera exposure of f/stop depending on the specific speed of the photographic surface.

8. The system of claim 7 wherein said means for determining the proper exposure comprises a pair of resistors.

9. A system for determining the proper exposure for a photographic surface comprising:
   a. a photo detector for detecting the intensity of incoming illumination and converting the same to an electrical output signal,
   b. means for amplifying such electrical signal,
   c. time output signal producing means coupled to said photo detector for producing a time output signal proportional to the time the illumination is present on said photo detector,
   d. multiplier means coupled to said photo detector and said time output signal producing means for multiplying said time output signal and said electrical output signal to yield a time-light product output signal, and
   e. readout means comprising resistor means representative of the speed of the photographic surface and f/stop values, and means responsive to said time-light product output signal and coupled to said resistor means for determining the proper exposure depending upon the characteristics of the photographic surface.

10. A system for determining the proper exposure for a photo sensitive surface of a camera comprising:
   a. a photo detector for detecting the intensity of incoming illumination and converting the same to an illumination output signal,
   b. a first amplifier electrically connected to said detector for amplifying such signal to a predetermined level,
   c. a second amplifier electrically connected to said detector and actuatable when useful light is present to provide a high gain illumination output signal,
   d. time signal converter means coupled to said second amplifier for receiving said illumination output signal from said second amplifier and providing a time output signal proportional to the time the illumination is present,
   e. supplemental timer means communicating with said time signal converter means for supplying thereto a fixed time output signal where available light is used,
   f. a multiplier coupled to said second amplifier and said time signal converter means for multiplying said time output signal and said illumination output signal to yield a time-light product output signal, and
   g. readout means comprising resistor means representative of the film speed and f/stop values, and means responsive to said product output signal and coupled to said resistor means for determining the proper exposure setting of the camera depending upon the characteristics of the photo sensitive surface.

* * * * *